United States Patent [19]

Marrow et al.

[11] Patent Number: 4,958,688
[45] Date of Patent: Sep. 25, 1990

[54] POWER DRIVEN GOLF HOLE CUTTING APPARATUS

[76] Inventors: Brett Marrow, P.O. Box 7136, Ancaster, Ontario, Canada, L9G 3L4; Jim Harris, 1276 Shaver Road, Ancaster, Ontario, Canada, L9G 3L1

[21] Appl. No.: 208,591

[22] Filed: Jun. 20, 1988

[30] Foreign Application Priority Data

Jun. 29, 1987 [CA] Canada .................................. 540787

[51] Int. Cl.⁵ ........................ E21B 12/06; A01B 45/00
[52] U.S. Cl. ........................................ 172/22; 172/25; 74/424.8 A
[58] Field of Search ...................... 172/21, 22, 25, 110, 172/111, 522, 533, 125, 19, 20, 41; 175/20, 203, 313; 74/424.8 A; 294/50.5, 50.7

[56] References Cited

U.S. PATENT DOCUMENTS

| 3,104,725 | 9/1963 | Buchele | 175/244 |
|---|---|---|---|
| 3,163,455 | 12/1964 | Tuggle, Sr. | 294/50.7 X |
| 3,180,438 | 4/1965 | Dickinson et al. | 175/239 |
| 3,388,754 | 6/1968 | Barton | 175/244 |
| 3,416,831 | 12/1968 | Bishop | 294/50.5 |
| 3,444,938 | 5/1969 | Ballman | 175/313 X |
| 3,515,230 | 6/1970 | Tomaine | 175/242 |
| 3,733,914 | 5/1973 | Sheesley | 74/424.8 A X |
| 3,786,877 | 1/1974 | Schaefer et al. | 175/249 |
| 3,817,337 | 6/1974 | Panak et al. | 172/22 X |
| 3,817,338 | 6/1974 | Guest | 175/239 |
| 4,023,431 | 5/1977 | Paulas | 74/424.8 A |
| 4,057,114 | 11/1977 | Anderson | 172/41 X |
| 4,130,170 | 12/1978 | Holman | 175/245 |
| 4,204,577 | 5/1980 | Bittle | 294/50.7 X |
| 4,421,176 | 12/1983 | Tuggle et al. | 172/41 |
| 4,763,735 | 8/1988 | Gay | 172/22 X |

FOREIGN PATENT DOCUMENTS

| 884180 | 10/1971 | Canada . | |
| 0598741 | 5/1978 | Switzerland | 172/41 |

*Primary Examiner*—Randolph A. Reese
*Assistant Examiner*—Jeffrey L. Thompson
*Attorney, Agent, or Firm*—Sixbey, Friedman, Leedom & Ferguson

[57] ABSTRACT

There is provided a new and useful power driven golf hole cutting apparatus comprising an engine, an elongated shaft having first and second ends and operatively connected at or near the first end to the engine and driven in rotation by the engine, and a cutter head operatively connected to the second end of the shaft whereby the head is driven in rotation by the shaft, the cutter head comprising a somewhat elongated cylindrical member having upper and open lower ends and the outside diameter of which member approximates the inside diameter of a golf hole. A plunger arrangement is provided for removing a turf plug from the cutter head.

15 Claims, 3 Drawing Sheets

POWER DRIVEN GOLF HOLE CUTTING APPARATUS

This application relates to a power driven golf hole cutting apparatus.

BACKGROUND OF THE INVENTION

It is necessary from time to time and for various reasons to relocate the holes on the greens of a golf course. Some such reasons are to prevent undue wear on one part of the green, to provide variety for regular golfers and to take account of turf conditions. As well, in modern tournament play the position of the hole may be changed on a daily basis in the course of the tournament to maintain or increase the challenge to the golfers.

Particularly in those cases where frequent hole changes are required, a problem has persisted in that apparatus for cutting new holes have to date generally been manually powered. As a result, the hole changing process has been slow and tiring for golf course maintenance personnel. This has contributed to holes being cut which are of less than desired regularity. As well, damage to the green surrounding the hole has been a problem in these situations.

There has thus been an ongoing need for an efficient power driven golf hole cutting apparatus. The present invention provides such an apparatus.

PRIOR ART

As indicated above, prior golf hole cutting apparatus have generally been concerned with variations of manual apparatus. Among these is U.S. Pat. No. 3,416,831, issued Dec. 17, 1968, to Bishop, et al. That patent relates to a golf hole cutting apparatus which is manually powered. The patent is primarily directed at a central rod in a cutter head utilized to break any vacuum holding a plug of turf and soil in a hole.

U.S. Pat. No. 4,204,577, issued May 25, 1980, to Bittle relates to another type of manually powered hole cutter which is primarily concerned with protection of the surface of the green in the area in which the hole is to be cut.

Neither of these patents addresses the problems discussed above.

The present invention provides a power operated hole cutter which greatly simplifies the golf hole cutting process.

SUMMARY OF THE INVENTION

A golf hole cutting apparatus has now been developed which is engine driven and which provides a very clean rapid golf hole cutting operation.

Accordingly, in one broad aspect the invention provides a power driven golf hole cutting apparatus comprising an engine, an elongated shaft having first and second ends and operatively connected at or near the first end with the engine to be driven in rotation by the engine, and a cutter head operatively connected to the second end of the shaft whereby the head is driven in rotation by the shaft, the cutter head comprising a somewhat elongated cylindrical member having upper and open lower ends, and the outside diameter of which member approximates the inside diameter of a golf hole.

In a further embodiment a plunger means is provided within the cutter head for efficient removal of the soil plug from the head.

In a further embodiment the plunger means is also power driven by the engine.

In a further embodiment at least one alternate cutter head is provided in which the outside diameter of said cylindrical member differs from the inside diameter of a golf hole. Preferably, a series of interchangeable cutter heads of differing diameters are provided.

BRIEF DESCRIPTION OF THE DRAWINGS

In drawings which illustrate embodiments of the invention.

Figure 1:
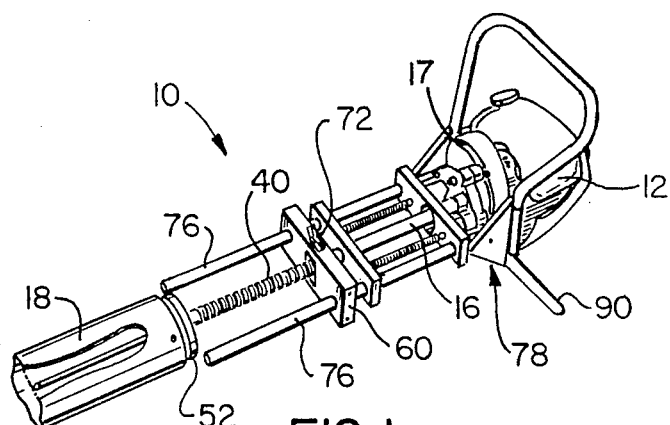
FIG. 1 is a perspective view of an apparatus according to the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

The apparatus 10 includes an engine 12 operatively connected to the upper end 14 of shaft 16. A cutter head 18 is operatively connected to the lower end 20 of shaft 16.

Any suitable engine 12 can be used in the invention, but a small gasoline engine is preferred. In the preferred embodiment the engine, is connected to shaft 16 through a known clutch mechanism 17 responsive to engine speed, such as a centrifugal clutch arrangement.

Figure 2:
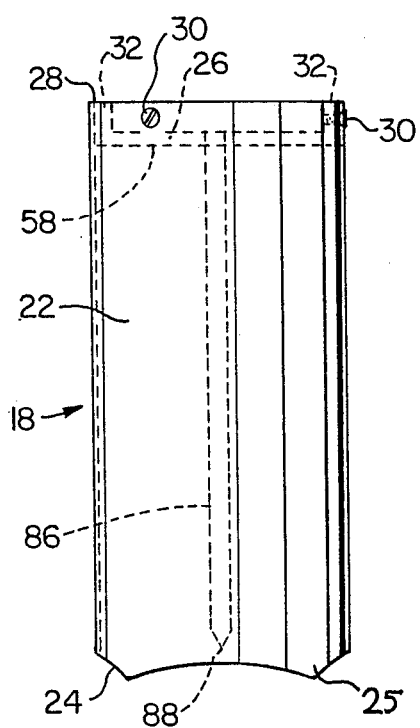
FIG. 2 is an elevation of a cutter head for use in an apparatus according to the invention.
Figure 3:
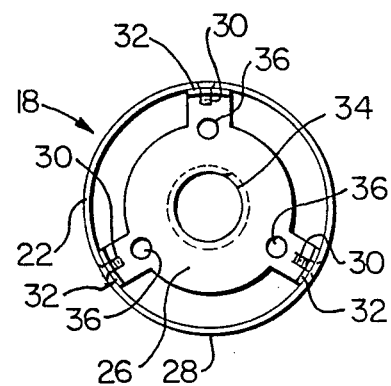
FIG. 3 is a plan view of the cutter head of FIG. 2.

With reference to FIGS. 2 and 3, the cutter head 18 comprises a cylindrical member 22, the bottom edge 24 of which is preferably profiled to form an effective cutting edge. The profile may form downwardly projecting teeth such as those illustrated at 25 in FIG. 2. A guide ring or plate 26 is recessed below the upper edge of the member 22 and is secured in place by screws 30 through upstanding tabs 32.

The outside diameter of cylindrical member 22 of cutter head 18 will in a preferred standard format closely approximate the inside diameter of a golf hole. However, the apparatus 10 may be utilized for other turf cutting requirements in addition to cutting golf holes. For example, damaged areas on tees, greens and elsewhere on the golf course may be cleanly removed using the apparatus. For this purpose a series of interchangeable members 22 of differing diameters are preferably included.

The guide ring 26 includes a central threaded aperture 34 and, preferably, a series of apertures 36.

Figure 4:
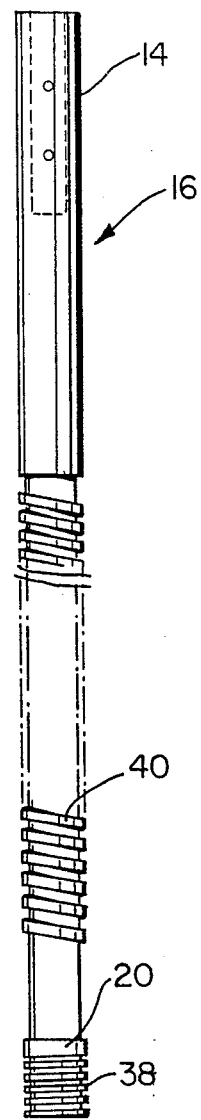
FIG. 4 is an elevation view of a shaft for use in the apparatus according to the invention.

With reference to FIG. 4, the shaft 16 includes a lower threaded section 38 at its lower end 20 which is designed to be threadedly engaged with the central threaded aperture 34 of guide ring 26. Any other suitable means can be employed for fixing cutter head 18 to shaft 16.

The shaft 16 also includes the intermediate threaded section 40.

Figure 5:
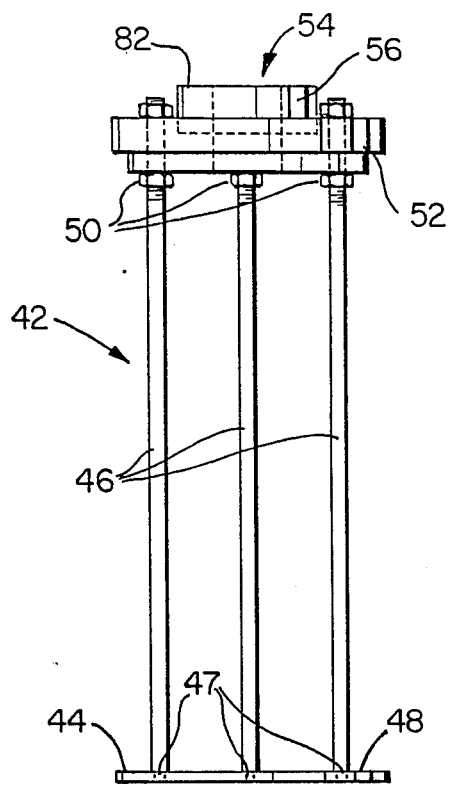
FIG. 5 is an elevation view of a plunger means for use in an apparatus according to the invention.
Figure 6:
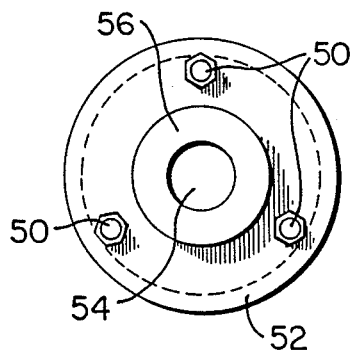
FIG. 6 is a plan view of the plunger means of FIG. 5.

A further preferred configuration of the invention is illustrated in FIGS. 5 and 6. Those figures illustrate a plunger means 42 which co-operates with the cutter head 18 for removal of a soil plug from the cutter head when a golf hole has been cut and the apparatus removed from the cut hole. The plunger means 42 includes a plunger plate 44, the outside diameter of which is less than the inside diameter of the cutter head 18, so that the plunger plate 44 is freely slidable within cutter head 18. The lower ends 47 of rods 46 are fixed to the upper side 48 of plate 44. The rods 46 are preferably distributed about plate 44 in a manner to correspond to the distribution of apertures 36 in ring 26 of cutter head 18, and the rods 46 have a diameter chosen to allow the rods to pass through the apertures 36 and to be freely slidable in those apertures. The upper ends 50 of rods 46 pass through and are secured to a control plate 52. Control plate 52 includes a central aperture 54 which is of greater diameter than the outside diameter of any part of shaft 16, whereby the control plate 52 is freely slidable along shaft 16. The control plate 52 is preferably provided with a bearing 56 which may be in light sliding contact with the shaft 16.

As thus described, when in use the cutter head 18 is rotated into the soil by the action of the engine transmitted via the rotating shaft 16, the plunger plate 44 will be forced upwardly within the cutter head 18 to ultimately bring up against the underside 58 of guide ring 26. The plunger plate 44 will in turn force the rods 46 and the control plate 52 upwardly along the shaft 16. When the cutter head 18, now containing a soil plug, is removed from the soil to leave the golf hole, force can be applied to the control plate 52 to force the plunger plate 44 downwardly within the cutter head 18 to thereby expel the soil plug from the cutter head.

Figures 7, 8:
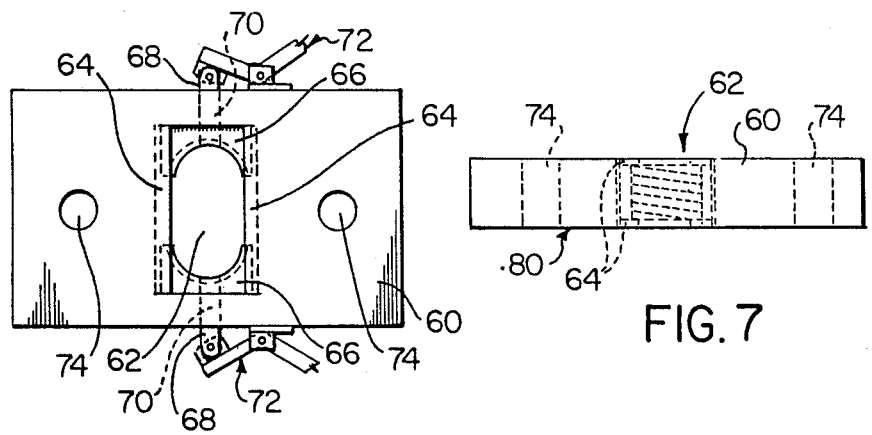
FIG. 7 is an elevation of a pusher plate for use in an apparatus according to the invention.
FIG. 8 is a plan view of the pusher plate of FIG. 7.
Figure 9:
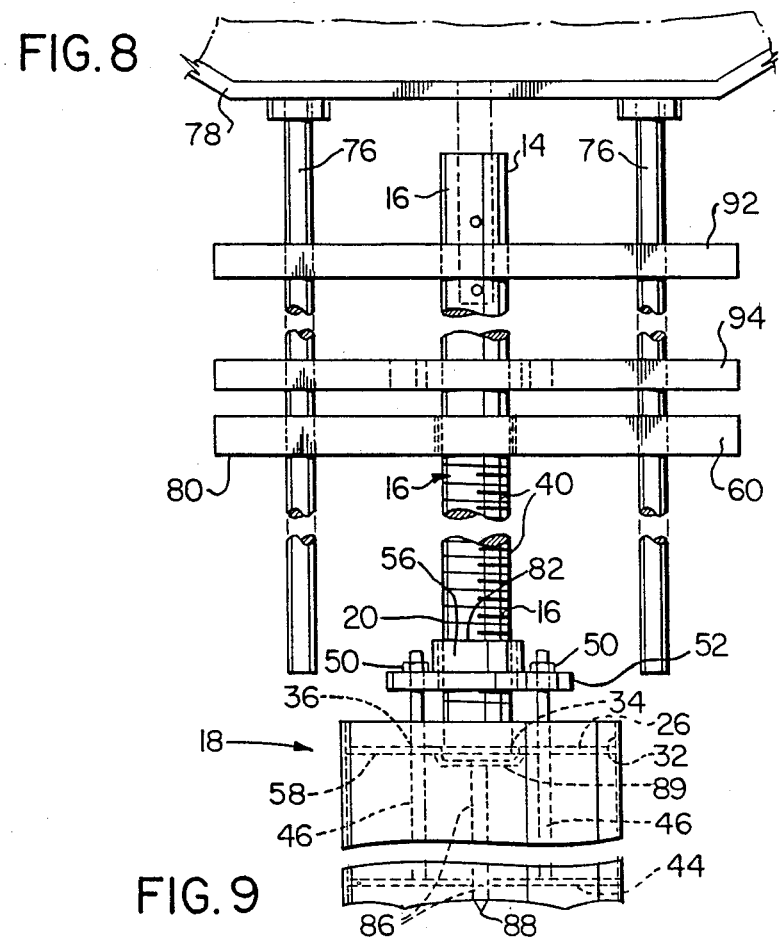
FIG. 9 is an elevation view of assembled components for use in the apparatus according to the invention.

In a preferred embodiment of the invention, power transfer means is provided by which the plunger means 42 utilizes power from engine 12 to expel the soil plug from cutter head 18. With reference to FIGS. 7 to 9, a pusher plate 60 is illustrated which is selectively engagable with the intermediate threaded section 40 of shaft 16. Thus, the pusher plate 60 includes a rectangular aperture 62, the shorter sides of which are of greater length than the diameter of shaft 16. Within the aperture 62 are a pair of guide tracks 64. A pair of threaded jaws 66 are slidably mounted in guide tracks 64. Control members 68 extend from threaded jaws 66 through apertures 70 in the sides of pusher plate 60. Means 72 is provided for extending or retracting members 68 in apertures 70 for thereby extending or retracting the jaws 66. Means 72 may comprise any suitable mechanism; for example, screws fixed to jaws 66 operating through threaded apertures 70, or various types of levered mechanisms. It is preferred that the means be lockable against retraction or extension.

A pair of vertically extended apertures 74 are provided through the pusher plate 60 on opposite sides of rectangular aperture 62.

Where the pusher plate 60 is utilized, a pair of vertically extending rods 76 (FIG. 9) is provided extending vertically from a mounting frame 78. Rods 76 pass through the apertures 74 in pusher plate 60. The apertures are designed to allow the plate 60 to slide freely on rods 76. Rods 76 restrain plate 60 against rotation.

In use when a hole has been cut using the apparatus and the soil plug is within the cutter head 18, means 72 are activated to extend threaded jaws 66 into engagement with the intermediate threaded section 40 of shaft 16. Rotation of shaft 16 by means of engine 12 will then cause the pusher plate 60 to traverse the threaded section 40 of shaft 16. The thread orientation is chosen to move plate 60 downwardly on threaded section 40. In the course of traversing threaded section 40, the bottom side 80 of plate 60 contacts the upper side 82 of bearing 56 and forces the plunger means 42 downwardly along shaft 16. The plunger plate 44 is thus forced downwardly through cutter head 18 and expels the soil plug from the cutter head.

The length of the rods 46 in plunger means 42 is preferably chosen such that the control plate 52 brings up against the upper edge 28 of cutter head 18 or against guide ring 26 when the plunger plate 44 is at the level of the bottom edge 24 of cutter head 18. At the same time the intermediate threaded section 40 of shaft 16 is positioned on the shaft such that, when activated, pusher plate 60 will force the control plate 52 downwardly only to a position just above that where plate 52 is brought up against edge 28 of head 18 or guide ring 26. At this point the shaft 16 can again rotate freely within pusher plate 60 or so that no further downward movement occurs.

When the soil plug has been expelled from cutter head 18, the jaws 66 can be released and the pusher plate 60 slid upwardly to a position on shaft 16 above or along threaded section 40. Any desired means can be utilized to maintain the plate 60 in position above or along the threaded section 40. Alternatively, once the threaded jaws 66 are released from threaded section 40, the plate 60 can simply be left to ride upwardly as the control plate 52 rises when the next hole is cut. The latter alternative may be less desirable because of the possibility of inadvertent jamming of pusher plate 60 on rods 76.

As an additional feature of the preferred embodiment, an elongated cylindrical projection 86 pointed at the lower end 88 is secured to the end of shaft 16 centrally within the cutting head 18. This projection extends between the upper and lower edges of head 18 and may project below the lower edge. As an alternate securement means, bracket 89 to which the projection is secured may be provided secured to guide ring 26 and extending below the lower end of shaft 16.

Where the projection 86 is present, an aperture is provided centrally of the plunger plate 44 to permit the plate to slide freely over the projection.

The projection 86 is useful in accurately centering the cutting head 18 prior to cutting the hole.

In the preferred embodiment the mounting frame 78 includes support struts for the motor (not shown) and a pair of handles 90. As well, a pair of support plates 92 and 94 are secured on rods 76 for additional rigidity. Shaft 16 passes through apertures provided in plates 92 and 94.

Thus it is apparent that there has been provided in accordance with the invention a new and useful power driven golf hole cutting apparatus that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A power driven golf hole cutting apparatus comprising:
   (a) an engine;
   (b) an elongated shaft having first and second ends and operatively connected at or near said first end to be driven in rotation by said engine;
   (c) a cutter head operatively connected to said second end of said shaft whereby said cutter head is driven in rotation by said shaft, said cutter head comprising a somewhat elongated cylindrical member having upper and open lower ends, said lower end having a cutting edge, and wherein the outside diameter of said cylindrical member defines the insides diameter of a hole cut by said apparatus;
   (d) plunger means within said cutter head and movable between a first position proximate the top of said cutter head to a second position proximate the bottom thereof, said plunger means comprising a plunger plate which is freely movable axially within said cutter head and control means operatively connected to said plunger plate and extending upwardly from said plunger plate through the upper end of said cutter head; and
   (e) power transfer means for selectively transferring the rotation of said shaft to linear motion of said control means to thereby cause said control means to move said plunger means downwardly from said first to said second position.

2. The apparatus of claim 1 wherein the outside diameter of said cylindrical member approximates the inside diameter of a golf hole.

3. The apparatus of claim 1 including a series of said cutter heads which may be selectively operatively connected to said second end of said shaft and wherein said cylindrical member in each of said cutter heads has a different outside diameter than any other of said cutter heads.

4. The apparatus of claim 1 including handle means associated with said engine for manipulating said apparatus.

5. The apparatus of claim 1 including an engine speed activated clutch mechanism between said engine and said shaft.

6. The apparatus of claim 1 wherein said cutter head is fixed to said second end of said shaft and is coaxial with said shaft.

7. The apparatus of claim 1 wherein said cutter head includes therein a thin cylindrical projection extending axially downwardly from said upper end of said cutter head.

8. The apparatus of claim 7 wherein said thin cylindrical projection includes a lower end which is tapered to a point and extends to approximately the lower end of said cutter head.

9. The apparatus of claim 7 wherein said thin cylindrical projection includes a lower end which is tapered to a point and which extends below the lower end of said cutter head.

10. The apparatus of claim 1 wherein said cutting edge is profiled.

11. The apparatus of claim 1 wherein the bottom of said cutting head is profiled to provide a series of downwardly projecting teeth.

12. The apparatus of claim 1 wherein said control means comprises at least one rod fixed at one end to said plunger plate and having its other end extending upwardly through the upper end of said cutter head.

13. The apparatus of claim 1 wherein said control means comprises a control plate slideably mounted on said shaft and means operatively connecting said control plate to said plunger plate.

14. The apparatus of claim 13 wherein said means operatively connecting comprises at least two rods fixed at one end to said plunger plate and at the other end to said control plate.

15. The apparatus of claim 13 wherein said shaft is threaded and wherein said power transfer means includes a pusher plate mounted on said shaft, said pusher plate selectively engageable with said threaded part of said shaft and restrained against rotation, whereby, when said pusher plate is engaged with said threaded part of said shaft and said shaft rotated, said pusher plate is caused to travel down said shaft to engage said control plate to thereby move said plunger plate downwardly within said cutter head.

* * * * *